United States Patent
Higuchi

[19]

[11] Patent Number: 5,970,259
[45] Date of Patent: Oct. 19, 1999

[54] OPTICAL APPARATUS

[75] Inventor: Tatsuji Higuchi, Akiruno, Japan

[73] Assignee: Olympus Optical Co., Ltd., Tokyo, Japan

[21] Appl. No.: 09/149,793

[22] Filed: Sep. 8, 1998

[30]  Foreign Application Priority Data

Sep. 9, 1997 [JP] Japan ................................. 9-244373

[51] Int. Cl.$^6$ ............................. G03B 13/34; G03B 9/00; G03B 17/00; G02B 7/04
[52] U.S. Cl. ............................. 396/79; 396/85; 396/133; 396/458; 396/542; 359/698; 359/701; 359/740; 359/823
[58] Field of Search ................................. 396/79–83, 72, 396/133, 144, 85, 86, 87, 542, 508, 458, 468; 359/696, 697, 698, 694, 823, 824, 699, 700, 701, 738, 739, 740

[56]  References Cited

U.S. PATENT DOCUMENTS 5,489,958  2/1996  Katagiri et al. ................... 396/133 X
5,508,781  4/1996  Imai et al. .............................. 396/542
5,559,571  9/1996  Miyamoto et al. ..................... 396/542
5,724,194  3/1998  Ishikawa ............................... 396/696

*Primary Examiner*—W. B. Perkey
*Attorney, Agent, or Firm*—Volpe and Koenig, P.C.

[57]  ABSTRACT

An optical apparatus according to the present invention includes a cylindrical holding barrel, a lens moving mechanism including a cylindrical cam which is rotatably fitted on an outer surface of the holding barrel in such a manner that a plurality of moving lens frames held in the holding barrel are moved in an optical axis direction, a light quantity adjusting mechanism held in the holding barrel, for adjusting a quantity of light passing therethrough, lens moving mechanism driving sources for driving the lens moving mechanism, and light quantity adjusting mechanism driving sources for driving the light quantity adjusting mechanism. The lens moving mechanism driving sources and the light quantity adjusting mechanism driving sources are held in the holding barrel.

5 Claims, 4 Drawing Sheets

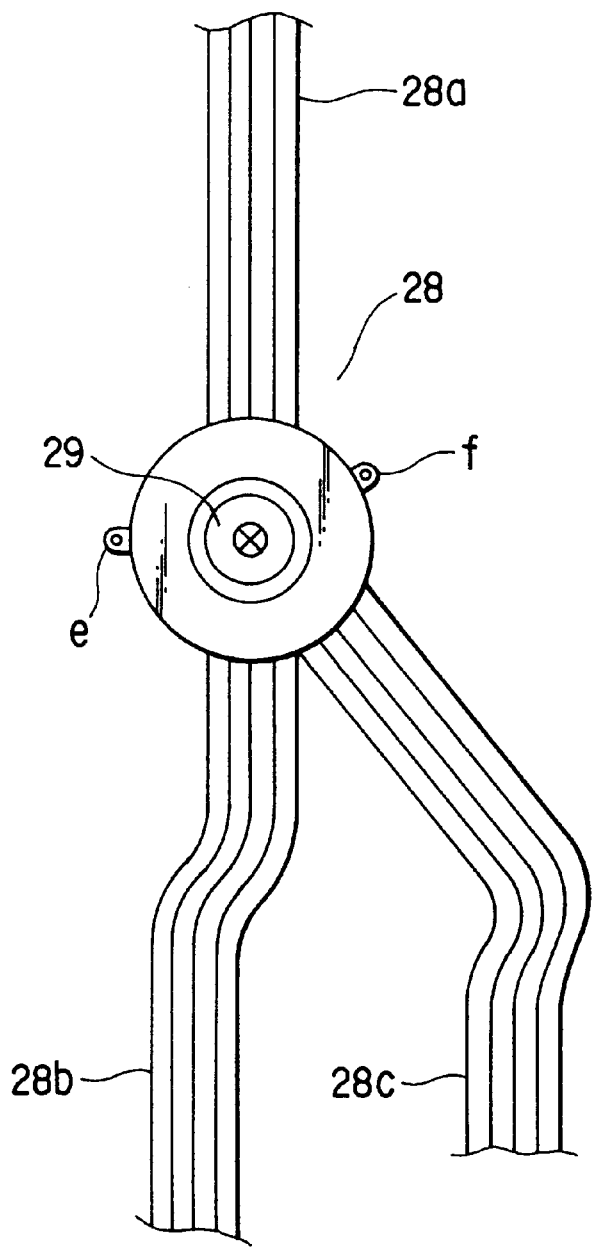
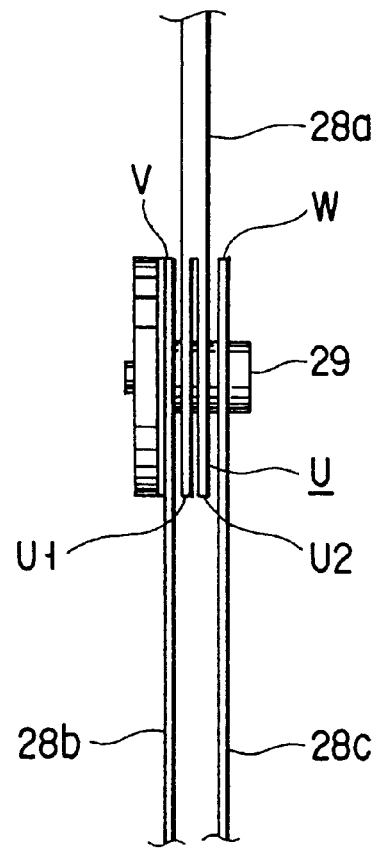
FIG. 7
FIG. 8

OPTICAL APPARATUS

BACKGROUND OF THE INVENTION

The present invention relates to an optical apparatus such as a camera and, more particularly, to an optical apparatus including a lens barrel unit with a lens moving mechanism and its driving source, and a light quantity adjusting mechanism and its driving source.

In an optical apparatus such as an electronic camera including a lens barrel unit having a lens moving mechanism for moving a moving barrel frame in an optical axis direction and its driving source, and a light quantity adjusting mechanism such as an aperture shutter and its driving source, the driving sources or flexible printed boards for signal transfer between the driving sources and external circuits are partly exposed outside a holding barrel serving as a main body of the lens barrel unit. The number of the flexible printed boards corresponds to that of driving sources, and they are connected to external electric circuits.

The exposure or protrusion of driving sources and flexible printed boards from the holding barrel causes the following problems.

The shape and position of a cylindrical cam, which is rotatably mounted on the outer surface of the holding barrel as a member for driving a moving lens frame, is greatly restricted. The flexible printed boards are generally flexible but sensitive to an external force and durability. If, therefore, part of the flexible printed board is exposed outside the holding barrel, it is likely to be broken or disconnected in contact with other elements when the apparatus is assembled. The elements have to be mounted outside the holding barrel with a considerably large space so as not to interfere with the flexible printed boards, thus reducing efficiency of mounting on the apparatus.

If the plural driving sources inside the holding barrel and the electric circuits outside it are connected by a plurality of flexible printed boards, the following problem will arise:

When the driving sources in the holding barrel are assembled, a single flexible printed board can be used for each of the driving sources, thus improving in workability. If, however, the holding barrel is treated as a unit, the plural flexible printed boards obstruct the assemblage of the apparatus, and the space is increased. Jpn. UM Appln. KOKOKU Publication No. 7-5657 discloses a technique of transmitting a signal by bringing conductors of flexible printed boards into contact with each other. This technique is not however effective in resolving the above problems.

BRIEF SUMMARY OF THE INVENTION

An object of the present invention is to provide an optical apparatus including a lens barrel unit which is capable of easily achieving the optimum shape of a cylindrical cam for driving a moving lens frame, without any restriction on the shape of the cam and which has the advantages of high mounting efficiency and easy assembly.

To attain the above object, the optical apparatus of the present invention has the following features in constitution. The other features of the present invention will be clarified in the Description of the Embodiment.

An optical apparatus according to the present invention includes a cylindrical holding barrel, a lens moving mechanism including a cylindrical cam which is rotatably fitted on an outer surface of the holding barrel in such a manner that a plurality of moving lens frames held in the holding barrel are moved in an optical axis direction, a light quantity adjusting mechanism held in the holding barrel, for adjusting a quantity of light passing therethrough, lens moving mechanism driving sources for driving the lens moving mechanism, and light quantity adjusting mechanism driving sources for driving the light quantity adjusting mechanism. The lens moving mechanism driving sources and the light quantity adjusting mechanism driving sources are held in the holding barrel.

BRIEF DESCRIPTION OF THE SEVERAL VIEWS OF THE DRAWINGS

FIG. 7 is a plan view of the constitution of a flexible printed board for electrical connection between the inside and outside of the holding barrel of the optical apparatus according to the embodiment of the present invention; and FIG. 8 is a side view of the constitution of the flexible printed board shown in FIG. 7.

DETAILED DESCRIPTION OF THE INVENTION

Embodiment

Figure 1:
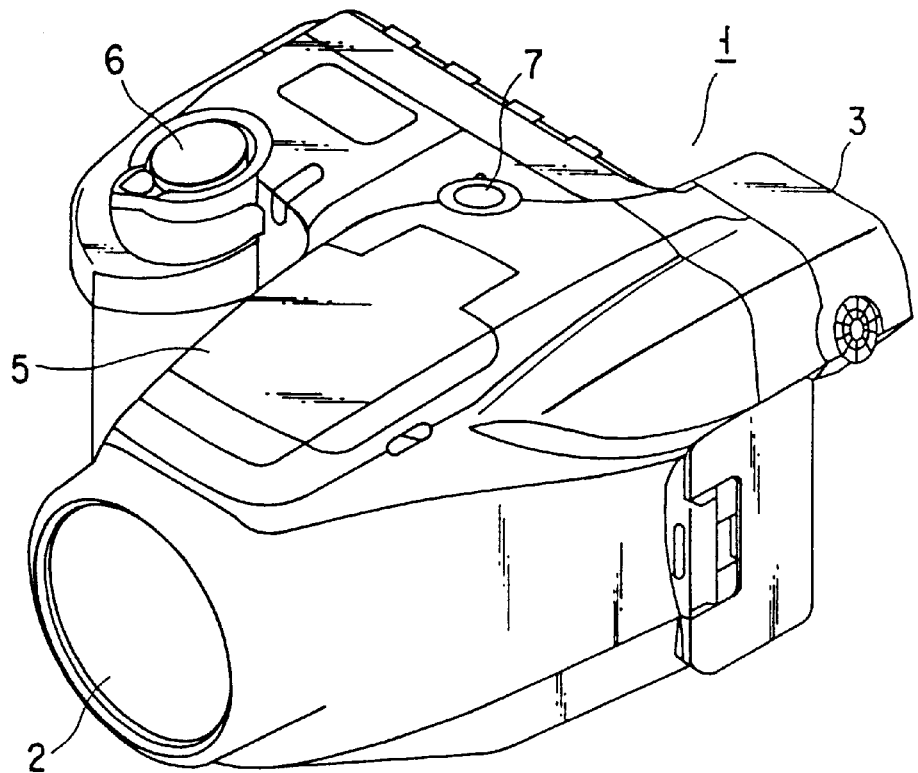
FIG. 1 is a front, perspective view of the outward appearance of an optical apparatus according to an embodiment of the present invention.
Figure 2:
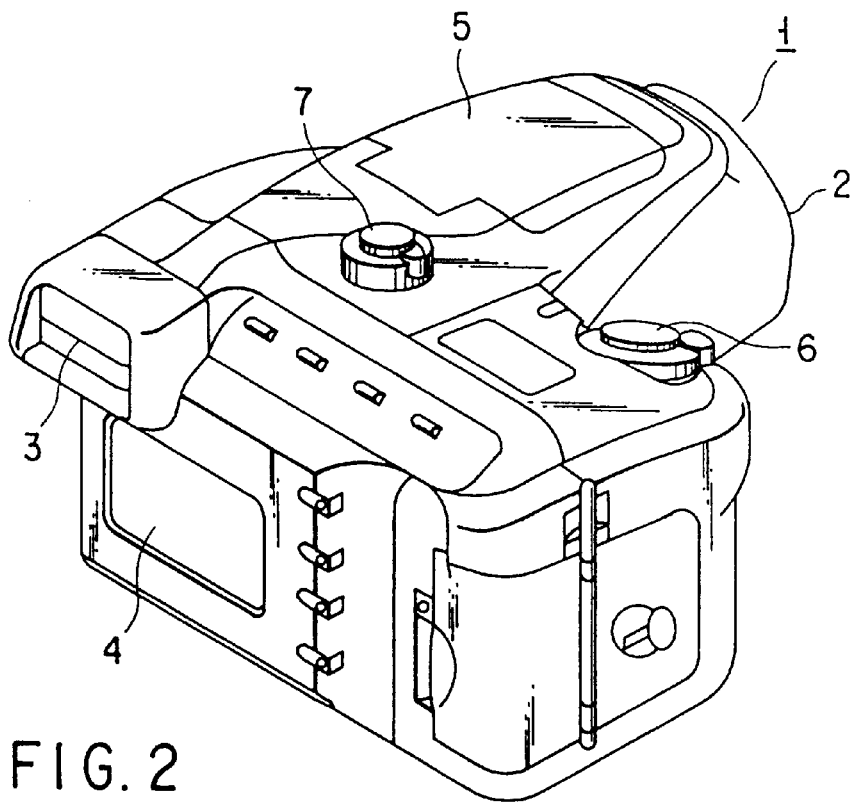
FIG. 2 is a back, perspective view of the outward appearance of the optical apparatus according to the embodiment of the present invention.

FIGS. 1 and 2 are front and back perspective views of an electronic camera according to an embodiment of the present invention.

In FIGS. 1 and 2, reference numeral 1 indicates a camera body; 2, an optical system (including optical components such as a zoom lens); 3, a finder; 4, an LCD unit for monitoring; 5, a stroboscope; 6, a release button; and 7, a power switch. Hereinafter a lens barrel unit including the optical system 2, which is the main part of the present invention, will be described in detail.

Figure 3:
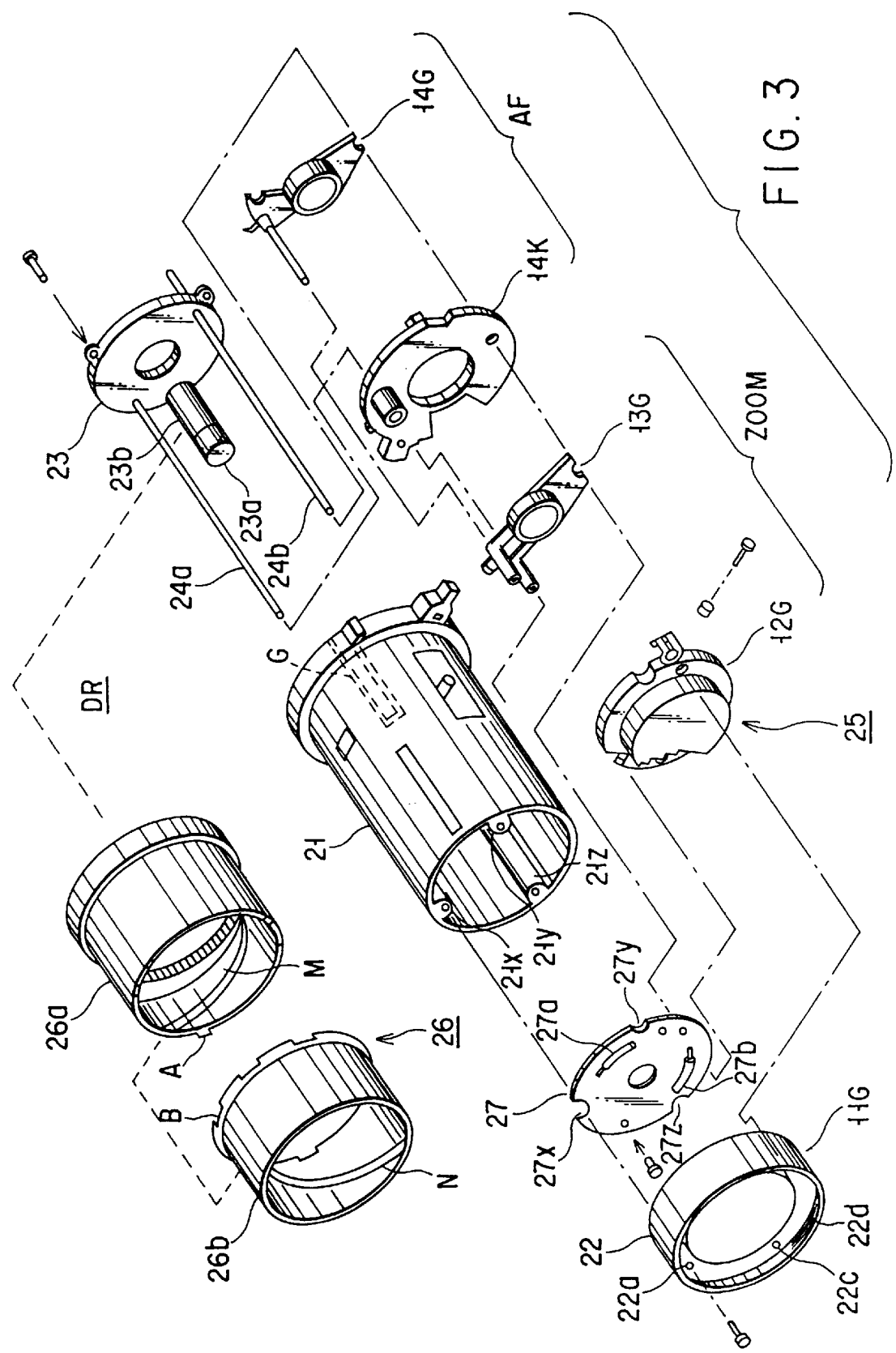
FIG. 3 is an exploded, perspective view of a lens barrel unit including an optical system built in the optical apparatus according to the embodiment of the present invention.

A cylindrical case as illustrated in the center of FIG. 3 is a holding barrel 21 both ends of which are opened. A front lens barrel 22 is fixed to the front open end of the holding barrel 21, which is shown on the left side of FIG. 3, by a fixing means such as a screw, while a mounting substrate 23 is fixed to the rear open end of the holding barrel 21, which is shown on the right side of FIG. 3, by the fixing means.

One end of each of paired guide shafts 24a and 24b is inserted into a hole of the mounting substrate 23 and adhesively fixed thereto, and the other end thereof is fitted to and supported by the rim portion of the front lens barrel 22. These paired guide shafts 24a and 24b are arranged in the holding barrel 21 in parallel to the optical axis. A moving lens frame group 25 (12G, 13G, 14G, etc.) is guided by the guide shafts 24a and 24b and moved slidably in the optical axis direction in the holding barrel 21.

Figure 4:
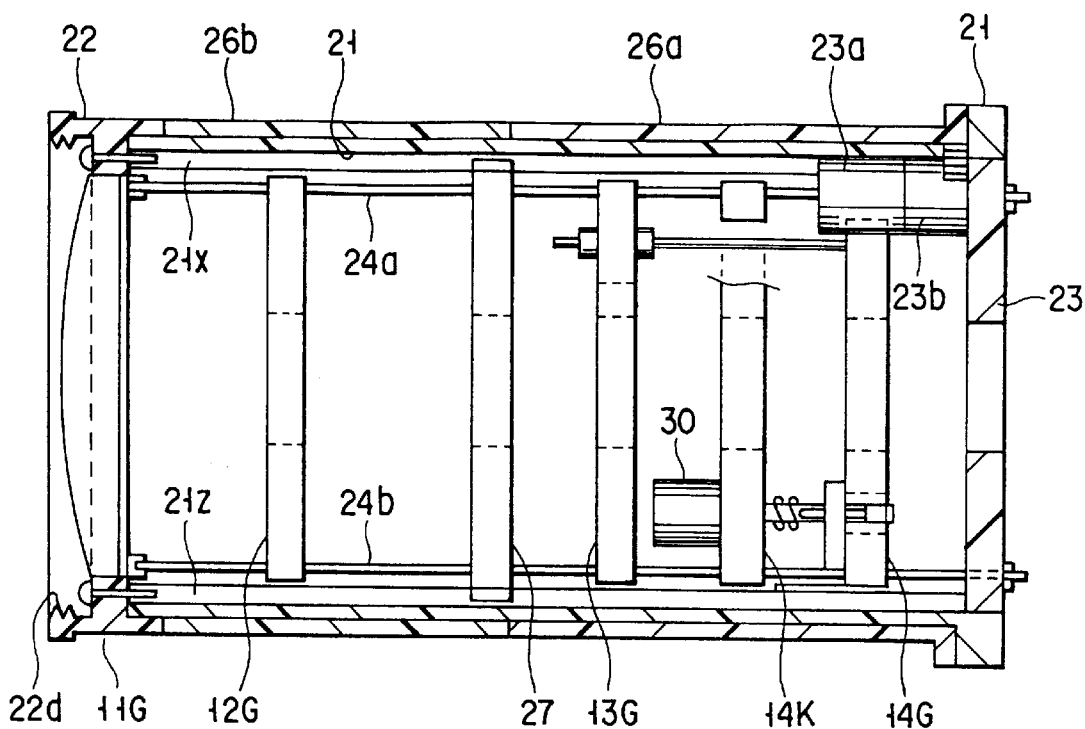
FIG. 4 is a cross-sectional view of the internal structure of the lens barrel unit of the optical apparatus according to the embodiment of the present invention, especially the arrangement of optical components.

As will be clearly described later, the moving lens frame 14G moves along the guide shafts 24a and 24b, together with the moving lens frames 12G and 13G, while it is mounted on a moving frame 14K. For convenience of description, in this embodiment, an optical component with a lens is denoted by G and that without a lens is represented by K. The components 12G and 13G are used chiefly for zooming (ZOOM), and the components 14G and 14K are for autofocus (AF), though they are not necessarily differentiated definitely. As illustrated in FIG. 4, the components 14G and 14K are driven so as to be relatively brought close to and separated from each other by means of an AF motor 30 mounted on the moving frame 14K, thereby adjusting the focus automatically.

Figure 6:
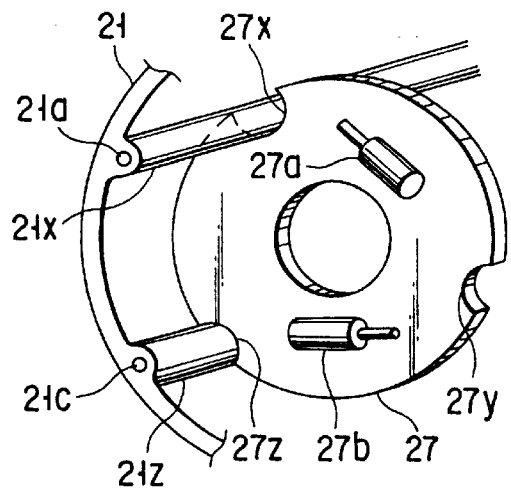
FIG. 6 is a partly perspective view of the internal structure of the lens barrel unit of the optical apparatus according to the embodiment of the present invention, especially for explaining a function of a rib provided on the inner surface of a holding barrel.

As illustrated in FIGS. 4 and 6, a plurality of ribs 21x, 21y and 21z (three ribs in this embodiment) are provided on the inner surface of the holding barrel 21 in parallel to the optical axis. These ribs extend from the front open end of the holding barrel 21 to the inner position thereof (which is beyond a light quantity adjusting unit 27 or an aperture shutter unit for adjusting a quantity of light passing therethrough). The ribs 21x, 21y and 21z therefore function as guide rails for the unit 27.

The light quantity adjusting unit 27 is shaped like a disk and has notched portions 27x, 27y and 27z on its periphery. If the notched portions 27x, 27y and 27z are engaged with the ribs 21x, 21y and 21z, respectively to slide the light quantity adjusting unit 27 using the ribs as guides, the unit 27 can easily be inserted inwardly from the front open end of the holding barrel 21.

The ribs 21x, 21y and 21z are provided at one end with screw holes 21a, 21b and 21c for screwing the front lens barrel 22.

Figure 5:
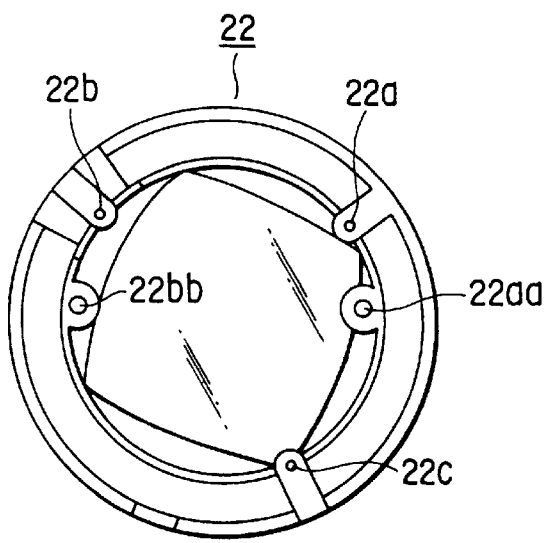
FIG. 5 is a plan view of the internal structure of the lens barrel unit of the optical apparatus according to the embodiment of the present invention, especially the inner side of a front lens barrel.

The front lens barrel 22 has a means for detachably mounting optical components such as an adapter lens and a filter from outside. More specifically, as shown in FIG. 3, mounting threads 22d are formed on the inner surface of the front lens barrel 22. The frame 22 also has screw inserting holes 22a to 22c corresponding to the screw holes 21a to 21c of the ribs 21x to 21z. Furthermore, as shown in FIG. 5, a pair of fitting holes 22aa and 22bb is formed in the inner surface of the front lens barrel 22 to fit their respective ends of the guide shafts 24a and 24b.

Returning to FIG. 3, a cam cylinder 26, which is the principal element constituting a lens moving mechanism DR shown in FIG. 3, is short and designed to move the moving lens frame group 25 back and forth in the optical axis direction. The cam cylinder 26 includes a first cam cylinder 26a having a convex cam M on its inner surface and a second cam cylinder 26b having a concave cam N thereon which are coupled to each other.

The cam cylinder 26 is fitted on the outer surface of the holding barrel 21 such that it can slidably contact and rotate thereon, and rotated by power transmitted from a driving source, which is constituted of a zooming motor 23a and a reduction mechanism 23b fixed on the mounting substrate 23, by means of a power transmission mechanism.

A projected portion A is formed on the coupling end face of the first cam cylinder 26a, and a recess portion B is provided in its corresponding portion of the coupling end face of the second cam cylinder 26b. These portions A and B are fitted to each other. Thus, the two cam cylinders 26a and 26b are coupled to each other, without any special components, in such a manner that they cannot rotate in the circumferential direction relatively to each other.

The convex cam M of the first cam cylinder 26a has different cam faces on both sides thereof. The moving lens frame 13G and moving frame 14K are energized to the cam faces by a spring (not shown) in which direction they are brought close to each other. Thus, the lens frame 13G and moving frame 14K are placed into contact with the cam faces and moved independently by rotation of the cam cylinder 26.

The light quantity adjusting unit 27 has a pair of driving sources (solenoid plungers) 27a and 27b for driving an aperture member and a shutter member, respectively.

The zooming motor 23a and reduction mechanism 23b, which serve as driving sources of the lens moving mechanism DR, and the solenoid plungers 27a and 27b, which serve as those of the light quantity adjusting unit 27, are held in the holding barrel 21 without protruding therefrom, as is a flexible printed board (not shown in FIG. 3), which connects the driving sources of the mechanisms DR and the unit 27 and the electric circuits provided outside the holding barrel 21.

FIGS. 7 and 8 illustrate a plurality of flexible printed boards 28a, 28b and 28c (three in this embodiment) for connecting electrical components inside the holding barrel 21 and electric circuits outside the barrel 21. One end portion of one (28a) of the flexible printed boards is connected to the electric circuits outside the holding barrel 21, whereas one end of each of the other flexible printed boards 28b and 28c are connected to the zooming motor 23a and solenoid plungers 27a and 27b. The other ends of the flexible printed boards 28a, 28b and 28c are provided with signal transmitting sections U(U1, U2), V and W, respectively, which are capable of transmitting signals by overlapping and contact of their pattern surfaces.

The signal transmitting section U of the flexible printed board 28a has signal transmitting sections U1 and U2 corresponding to the number of the other flexible printed boards 28b and 28c. In the embodiment of the present invention, the two signal transmitting sections U1 and U2 are double-sided terminal sections whose non-conductive faces are opposed to each other. The signal transmitting sections V and W of the other flexible printed boards 28b and 28c are one-sided terminal sections between which the signal transmitting sections U1 and U2 are sandwiched. These sections V and W are overlapped at a predetermined rotational position angle. A screw 29 is guided in the central openings of the four-layered signal transmitting sections U1, U2, V and W constituting the terminal sections and tightened to be electrically connected to one another. Thus, the signals of the flexible printed boards 28b and 28c are synthesized with that of the flexible printed board 28a and supplied to the electric circuits outside the holding barrel 21.

In order to bring the signal transmitting sections into exact contact with each other, lugs e and f each having a small hole for align the signal transmitting sections are formed on the periphery of the sections. These lugs are fitted to the projected portions of the mounting substrate 23 for alignment and fastened to the substrate 23.

As illustrated in FIG. 3, a groove G having a width and a depth adapted to the width and thickness of the flexible printed board 28, is formed in the wiring position of the inner surface of the holding barrel 21 in such a manner that the board 28 is formed easily thereon.

It is needless to say that the present invention is not limited to the above embodiment and various changes and modifications can be applied thereto.

Features of the Embodiment

[1] An optical apparatus according to the embodiment of the present invention comprises:

a cylindrical holding barrel 21;

a lens moving mechanism DR including a cylindrical cam 26 which is rotatably fitted on an outer surface of the holding barrel 21 in such a manner that a plurality of moving lens frames held in the holding barrel 21 are moved in an optical axis direction;

a light quantity adjusting mechanism 27 held in the holding barrel 21, for adjusting a quantity of light passing therethrough;

lens moving mechanism driving sources 23a and 23b for driving the lens moving mechanism DR; and light quantity adjusting mechanism driving sources 27a and 27b for driving the light quantity adjusting mechanism 27, wherein the lens moving mechanism driving sources 23a and 23b and the light quantity adjusting mechanism driving sources 27a and 27b are held in the holding barrel 21 without protruding from the holding barrel 21.

In the foregoing optical apparatus, since no electrical components are exposed outside the holding barrel 21, no restrictions are imposed on the shape of the cylindrical cam 26. The optimum shape of the cam can thus be achieved.

[2] An optical apparatus according to the embodiment of the present invention comprises:

a cylindrical holding barrel 21;

a lens moving mechanism DR including a cylindrical cam 26 which is rotatably fitted on an outer surface of the holding barrel 21 in such a manner that a plurality of moving lens frames held in the holding barrel 21 are moved in an optical axis direction;

a light quantity adjusting mechanism 27 held in the holding barrel 21, for adjusting a quantity of light passing therethrough;

lens moving mechanism driving sources 23a and 23b for driving the lens moving mechanism DR;

light quantity adjusting mechanism driving sources 27a and 27b for driving the light quantity adjusting mechanism 27; and a flexible printed board 28 for connecting electrical components of the lens moving mechanism driving sources 23a and 23b and the light quantity adjusting mechanism driving sources 27a and 27b and electric circuits provided outside the holding barrel 21, wherein the lens moving mechanism driving sources 23a and 23b, the light quantity adjusting mechanism driving sources 27a and 27b, and the flexible printed board 28 are held in the holding barrel 21 without protruding from the holding barrel 21.

In the foregoing optical apparatus, since no electrical components are exposed outside the cylindrical holding barrel 21, no restrictions are imposed on the shape of the cylindrical cam 26. Since, moreover, the flexible printed board 28 is provided inside the holding barrel 21, it does not hinder the apparatus from being assembled. The apparatus can thus easily be assembled.

[3] In the optical apparatus as described in above item [2], the holding barrel 21 includes a groove G for holding the flexible printed board 28 in an inner surface thereof.

In the above-described optical apparatus, the flexible printed board 28 is held in the groove G formed in the inner surface of the holding barrel 21. For this reason, the flexible printed board 28 can stably be positioned without any additional components, and the board 28 does not interfere with a light beam.

[4] In the optical apparatus as described in above item [2], the flexible printed board 28 includes a plurality of flexible printed boards 28a, 28b, having respective signal transmitting sections for transmitting a signal by overlapping and contact of pattern surfaces thereof, the flexible printed boards 28b, . . . other than one of the plurality of flexible printed boards 28a, are connected at one end to electrical components inside the holding barrel 21 and provided at other end with a signal transmitting section at a predetermined position. The one of the plurality of flexible printed boards includes a synthesized signal transmitting section having a contact piece capable of overlapping and contacting the signal transmitting sections of the other flexible printed boards; and the electrical components inside the holding barrel 21 are connected to electric circuits outside the holding barrel 21 through the one of the flexible printed boards.

In the optical apparatus described above, since the electrical components inside the holding barrel 21 are connected to their respective flexible printed boards 28b, 28c, . . . , they are improved in assembly. Since, furthermore, the signal lines of the flexible printed boards are combined with the flexible printed board 28a inside the holding barrel 21 to connect the electrical components inside the barrel 21 and the electric circuits outside the barrel 21 only through the board 28a, the apparatus can easily be assembled. A wiring space outside the holding barrel 21 is reduced to improve the utilization efficiency of an inner space of the apparatus. Since signal transmission between one of the flexible printed boards 28a and the other boards 28b, 28c, . . . is achieved by contact of the signal transmitting sections, no connectors are required. In this respect, too, the apparatus can be reduced in size and made compact.

[5] In the optical apparatus as described in above item [2], the flexible printed board 28 includes three flexible printed boards 28a, 28b and 28c, one of the flexible printed boards 28a, which is connected to an electric circuit outside the holding barrel 21, has two signal transmitting sections U1 and U2 each having an opening in a center thereof and a double-sided terminal section such that non-conductive faces thereof are opposed to each other, and the other flexible printed boards 28b and 28c have signal transmitting sections V and W each having an opening in a center thereof and a single-sided terminal section, the single-sided terminal sections of the signal transmitting sections V and W being overlapped so as to sandwich the double-sided terminal sections of the signal transmitting sections U1 and U2, and the apparatus includes a connecting means for guiding a screw 29 into the openings of a four-layered section constituting the terminal sections and tightening the screw to electrically connect the signal transmitting sections to one another.

In the foregoing optical apparatus, the signal lines of the three flexible printed boards 28a, 28b and 28c can be combined into one only by tightening the four signal transmitting sections by the single screw 29; thus, they are very improved in assembly.

I claim:

1. An optical apparatus comprising:

a cylindrical holding barrel;

a lens moving mechanism including a cylindrical cam which is rotatably fitted on an outer surface of the holding barrel in such a manner that a plurality of moving lens frames held in the holding barrel are moved in an optical axis direction;

a light quantity adjusting mechanism held in the holding barrel, for adjusting a quantity of light passing therethrough;

lens moving mechanism driving sources for driving the lens moving mechanism; and light quantity adjusting mechanism driving sources for driving the light quantity adjusting mechanism, wherein the lens moving mechanism driving sources and the light quantity adjusting mechanism driving sources are held in the holding barrel.

2. An optical apparatus comprising:

a cylindrical holding barrel;

a lens moving mechanism including a cylindrical cam which is rotatably fitted on an outer surface of the holding barrel in such a manner that a plurality of moving lens frames held in the holding barrel are moved in an optical axis direction;

a light quantity adjusting mechanism held in the holding barrel, for adjusting a quantity of light passing therethrough;

lens moving mechanism driving sources for driving the lens moving mechanism;

light quantity adjusting mechanism driving sources for driving the light quantity adjusting mechanism; and a flexible printed board for connecting electrical components of the lens moving mechanism driving sources and the light quantity adjusting mechanism driving sources and electric circuits provided outside the holding barrel, wherein the lens moving mechanism driving sources, the light quantity adjusting mechanism driving sources, and the flexible printed board are held in the holding barrel.

3. The optical apparatus according to claim 2, wherein the holding barrel includes a groove for holding the flexible printed board in an inner surface thereof.

4. The optical apparatus according to claim 2, wherein the flexible printed board includes a plurality of flexible printed boards having respective signal transmitting sections for transmitting a signal by overlapping and contact of pattern surfaces thereof;

the flexible printed boards other than one of the plurality of flexible printed boards, are connected at one end to electrical components inside the holding barrel and provided at other end with a signal transmitting section at a predetermined position;

the one of the plurality of flexible printed boards includes a synthesized signal transmitting section having a contact piece capable of overlapping and contacting the signal transmitting sections of the other flexible printed boards; and the electrical components inside the holding barrel is connected to electric circuits outside the holding barrel through the one of the flexible printed boards.

5. The optical apparatus according to claim 2, wherein the flexible printed board includes three flexible printed boards, one of the flexible printed boards, which is connected to an electric circuit outside the holding barrel, including two signal transmitting sections each having an opening in a center thereof and a double-sided terminal section such that non-conductive faces thereof are opposed to each other, and other flexible printed boards include signal transmitting sections each having an opening in a center thereof and a single-sided terminal section, the single-sided terminal sections of the signal transmitting sections being overlapped so as to sandwich the double-sided terminal sections of the signal transmitting sections; and said apparatus includes connecting means for guiding a screw into the openings of a four-layered section constituting the terminal sections and tightening the screw to electrically connect the signal transmitting sections to one another.

* * * * *